United States Patent [19]
Kobayashi

[11] Patent Number: 6,056,408
[45] Date of Patent: May 2, 2000

[54] METHOD AND DISPLAYING PROJECTED IMAGE AND PROJECTION-TYPE IMAGE DISPLAY APPARATUS

[75] Inventor: Kiwamu Kobayashi, Yokohama, Japan

[73] Assignee: Canon Kabushiki Kaisha, Tokyo, Japan

[21] Appl. No.: 09/083,392

[22] Filed: May 22, 1998

[30] Foreign Application Priority Data

May 28, 1997 [JP] Japan ..................................... 9-138551

[51] Int. Cl.⁷ .................................................. G03B 21/14
[52] U.S. Cl. .......................................... 353/122; 348/745
[58] Field of Search ................................ 353/69, 70, 101, 353/122, 46; 348/745, 746, 747, 806

[56] References Cited

U.S. PATENT DOCUMENTS

| | | | |
|---|---|---|---|
| 3,856,392 | 12/1974 | Harrison .................................. | 353/101 |
| 4,085,425 | 4/1978 | Hamil . | |
| 4,482,223 | 11/1984 | Koch et al. ............................. | 353/101 |
| 4,684,996 | 8/1987 | Baumeister . | |
| 4,857,998 | 8/1989 | Tsujihara et al. . | |
| 5,422,693 | 6/1995 | Vogeley et al. ......................... | 353/122 |
| 5,434,632 | 7/1995 | Carmichael ............................. | 353/101 |
| 5,444,506 | 8/1995 | Nakazawa et al. ..................... | 353/104 |
| 5,455,647 | 10/1995 | Fujiwara ................................. | 353/69 |
| 5,479,225 | 12/1995 | Kuga ....................................... | 353/101 |
| 5,537,168 | 7/1996 | Kitagishi et al. ....................... | 353/69 |
| 5,584,552 | 12/1996 | Nam-Su et al. ......................... | 353/69 |
| 5,664,858 | 9/1997 | Woo ......................................... | 353/70 |
| 5,742,698 | 4/1998 | Minami et al. ......................... | 348/745 |
| 5,748,183 | 5/1998 | Yoshimura et al. .................... | 345/173 |
| 5,872,593 | 2/1999 | Kawashima ............................ | 348/806 |
| 5,883,476 | 3/1999 | Noguchi et al. ........................ | 348/745 |

FOREIGN PATENT DOCUMENTS

| | | |
|---|---|---|
| 5-30520 | 2/1993 | Japan . |
| 5-48994 | 2/1993 | Japan . |
| 5-150369 | 6/1993 | Japan . |
| 5-153532 | 6/1993 | Japan . |
| 6-3577 | 1/1994 | Japan . |
| 6-189238 | 7/1994 | Japan . |
| 6-253241 | 9/1994 | Japan . |
| 7-28166 | 1/1995 | Japan . |
| 7-131742 | 5/1995 | Japan . |
| 7-143506 | 6/1995 | Japan . |
| 7-239504 | 9/1995 | Japan . |
| 7-319091 | 12/1995 | Japan . |
| 8-182013 | 7/1996 | Japan . |

Primary Examiner—William C. Dowling
Attorney, Agent, or Firm—Fitzpatrick, Cella, Harper & Scinto

[57] ABSTRACT

A projection-type image display apparatus includes a projected-image generating device arranged to display a projected image by projecting image light onto a projection plane, a detector for detecting a positional deviation of the projected image from a predetermined position on the projection plane, and a corrector for correcting the positional deviation of the projected image according to a result of detection by the detector.

26 Claims, 12 Drawing Sheets

THICK LINE : SCREEN
FINE LINE : PROJECTED IMAGE

METHOD AND DISPLAYING PROJECTED IMAGE AND PROJECTION-TYPE IMAGE DISPLAY APPARATUS

BACKGROUND OF THE INVENTION

1. Field of the Invention

The present invention relates to a method for displaying a projected image and a projection-type image display apparatus, and more particularly to a projection-type image display apparatus in which a screen serving as a projection plane has a function of inputting coordinates.

2. Description of Related Art

A conventional projection-type image display apparatus is arranged as shown in FIG. 3 to project an optical image 29 from a projection device 27 onto a screen 28. FIG. 4 shows also the structural arrangement of the conventional image display apparatus. As shown in FIG. 4, an optical image 34 from a projection device 30 which is controlled by a personal computer 37 is projected, as a projected image 32, onto a screen 33 by a projecting optical system 31 to be displayed on the screen 33. Referring to FIG. 13, in the case of the projection-type image display apparatus, parallel rays of light emitted from a light source 38 are made by a light valve 39 into an optical image. The optical image passes through a condenser lens 40 to be projected, as a projected image, by a projection lens 58 onto the screen 33. Some of the conventional projection-type image display apparatuses are arranged to have the function of adjusting the position of the projected image to a predetermined position on the screen 33, for example, by means of a screw disposed at a leg part of the projection device, so that the user is only allowed to manually adjust the position of the projected image by using the screw.

The projection-type image display apparatus of that kind, however, has presented the following problems in adjusting the position, the size and the angle of torsion of the image to the frame of the screen or a part serving as the screen.

(i) Since the adjusting work is necessary every time the apparatus is used, the adjustment is troublesome as it takes time before the use of the apparatus.

(ii) Since the adjustment is to be manually made, the accuracy of the adjustment is inadequate.

(iii) After adjustment, some deviation newly arises accordingly as time elapses. However, it is hardly possible to manually correct such new deviation successively.

In a case where the projection-type image display apparatus is provided with some pointing means for the function of inputting coordinates on the screen, the problems (i) to (iii) cause the following disadvantage.

In the apparatus arranged to input information on coordinates by a pointing means, the operator inputs the position information by pointing to desired coordinates. Then, an analytical process is carried out on the basis of data of the input to immediately obtain and display the coordinates on the screen.

This process is continuously repeated in real time in a manner called "echo back". The coordinates are inputted in real time while the operator compares his or her action of designating the position by the pointing means with the result of it displayed on the screen.

In such a case, if there is any discrepancy between the position of a projected image and the frame of the screen, the discrepancy (or deviation) results in a discrepancy between an actual designated position and a position echoed back. Then, the feeling of operation on the apparatus is greatly impaired by the discrepancy.

Therefore, the above-stated problems (i) to (iii) are serious for a projection-type image display apparatus having the coordinate inputting function which is to be carried out by some pointing means.

BRIEF SUMMARY OF THE INVENTION

It is a first object of the invention to provide a method for displaying a projected image on a screen without causing any deviation in the projected image.

It is a second object of the invention to provide a projection-type image display apparatus which displays a projected image on a screen without causing any deviation in the projected image.

To attain the first object, in accordance with an aspect of the invention, there is provided a method for displaying a projected image by projecting image light onto a projection plane, in which a positional deviation of the projected image from a predetermined position on the projection plane is detected by a detector and the positional deviation of the projected image is corrected according to a result of detection by the detector.

To attain the second object, in accordance with a first aspect of the invention, there is provided a projection-type image display apparatus, which comprises a projected-image generating device for displaying a projected image by projecting image light onto a projection plane, deviation detecting means for detecting a positional deviation of the projected image from a predetermined position on the projection plane, and correction means for correcting the positional deviation of the projected image according to a result of detection by the deviation detecting means.

To attain the second object, in accordance with a second aspect of the invention, there is provided a projection-type image display apparatus, which comprises a projected-image generating device for displaying a projected image by projecting image light onto a projection plane, an image pickup device for picking up images of the projected image and the projection plane, correction means for correcting a geometric state of the projected image, deviation detecting means for detecting a deviation of the projected image from the projection plane on the basis of the picked-up images of the projected image and the projection plane, and control means for controlling the correction means on the basis of the deviation detected by the deviation detecting means.

To attain the second object, in accordance with a third aspect of the invention, there is provided a projection-type image display apparatus, which comprises a projected-image generating device for displaying a projected image by projecting image light onto a projection plane, an image pickup device for picking up images of the projected image and the projection plane, correction means for correcting a geometric state of the projected image, deviation detecting means for detecting a deviation of the projected image from the projection plane on the basis of the picked-up images of the projected image and the projection plane, and control means for successively controlling the correction means on the basis of the deviation detected by the deviation detecting means.

To attain the second object, in accordance with a fourth aspect of the invention, there is provided a projection-type image display apparatus, which comprises a projected-image generating device for displaying a projected image by projecting image light onto a projection plane and capable of inputting coordinates, an image pickup device for picking up images of the projected image and the projection plane, correction means for correcting a geometric state of the projected image, deviation detecting means for detecting a deviation of the projected image from the projection plane on the basis of the picked-up images of the projected image and the projection plane, and control means for controlling the correction means, every time the coordinates are inputted, on the basis of the deviation detected by the deviation detecting means.

To attain the second object, in accordance with a fifth aspect of the invention, there is provided a projection-type image display apparatus, in which the correction means is arranged to correct a positional deviation of the projected image from the projection plane.

To attain the second object, in accordance with a sixth aspect of the invention, there is provided a projection-type image display apparatus, in which the correction means is arranged to correct a deviation in size of the projected image from the projection plane.

To attain the second object, in accordance with a seventh aspect of the invention, there is provided a projection-type image display apparatus, in which the correction means is arranged to correct torsion of the projected image with respect to the projection plane.

To attain the second object, in accordance with an eighth aspect of the invention, there is provided a projection-type image display apparatus, in which the projection plane is provided with a first marker group for defining a display area of the projection plane or for defining a coordinate input area of the projection plane.

To attain the second object, in accordance with a ninth aspect of the invention, there is provided a projection-type image display apparatus, in which the projected-image generating device is arranged to generate, as a part of the projected image, a second marker group for defining an image area of the projected image.

To attain the second object, in accordance with a tenth aspect of the invention, there is provided a projection-type image display apparatus, in which the projected-image generating device is arranged to generate the second marker group in a position corresponding to the first marker group on the projection plane.

To attain the second object, in accordance with an eleventh aspect of the invention, there is provided a projection-type image display apparatus, in which the deviation detecting means is arranged to detect a deviation of the projected image from the projection plane on the basis of coordinates of the first marker group and the second marker group of images picked up by the image pickup device.

To attain the second object, in accordance with a twelfth aspect of the invention, there is provided a projection-type image display apparatus, in which the deviation detecting means is arranged to extract three independent parameters indicative of a positional deviation, a deviation in size, and torsion.

To attain the second object, in accordance with a thirteenth aspect of the invention, there is provided a projection-type image display apparatus, in which the deviation detecting means is arranged to extract the parameter indicative of a positional deviation, as a two-dimensional vector whose origin is a barycenter of the first marker group and whose terminal is a barycenter of the second marker group.

To attain the second object, in accordance with a fourteenth aspect of the invention, there is provided a projection-type image display apparatus, in which the deviation detecting means is arranged to extract the parameter indicative of a deviation in size, as a ratio of the length of a line segment determined by two specific points of the first marker group to the length of a line segment determined by two specific points of the second marker group corresponding to the two specific points of the first marker group.

To attain the second object, in accordance with a fifteenth aspect of the invention, there is provided a projection-type image display apparatus, in which the deviation detecting means is arranged to extract the parameter indicative of torsion, as an angle formed by a two-dimensional vector determined by two specific points of the first marker group and a two-dimensional vector determined by two specific points of the second marker group corresponding to the specific points of the first marker group.

To attain the second object, in accordance with a sixteenth aspect of the invention, there is provided a projection-type image display apparatus, in which the correction means is arranged to optically correct a positional deviation, a deviation in size, and torsion independently of each other.

To attain the second object, in accordance with a seventeenth aspect of the invention, there is provided a projection-type image display apparatus, in which the correction means for correcting a positional deviation is a variable angle prism arranged by sealing an optically transparent substance within a space formed between two transparent optical members to form an arbitrary apex angle by causing at least one of the two optical members to turn with an urging force which is electrically controlled from outside.

To attain the second object, in accordance with an eighteenth aspect of the invention, there is provided a projection-type image display apparatus, in which the correction means for correcting torsion is an image rotator having a plurality of mirrors and arranged to cause a passing image to rotate along an optical axis by rotating the plurality of mirrors along the optical axis.

To attain the second object, in accordance with a nineteenth aspect of the invention, there is provided a projection-type image display apparatus, in which the correction means for correcting a deviation in size is a zoom optical system which is electrically controllable.

These and other objects and features of the invention will become apparent from the following detailed description of preferred embodiments thereof taken in connection with the accompanying drawings.

DETAILED DESCRIPTION OF THE INVENTION

Hereinafter, preferred embodiments of the invention will be described in detail with reference to the drawings.

Figure 1:
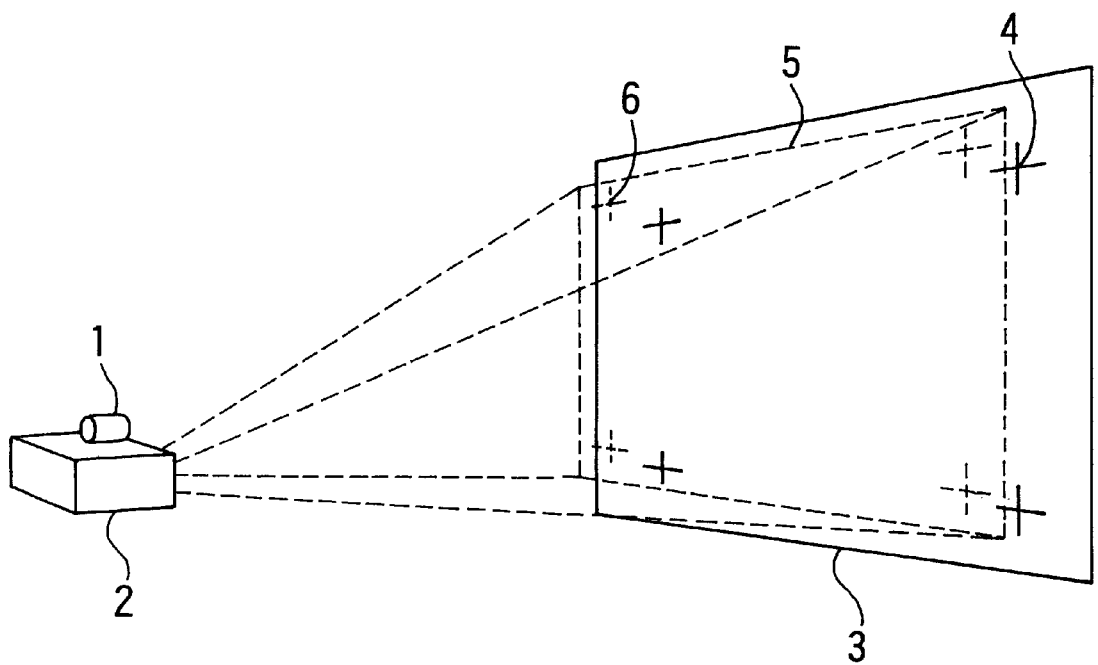
FIG. 1 shows in outline the entire projection-type image display apparatus according to a first embodiment of the invention.
Figure 2:
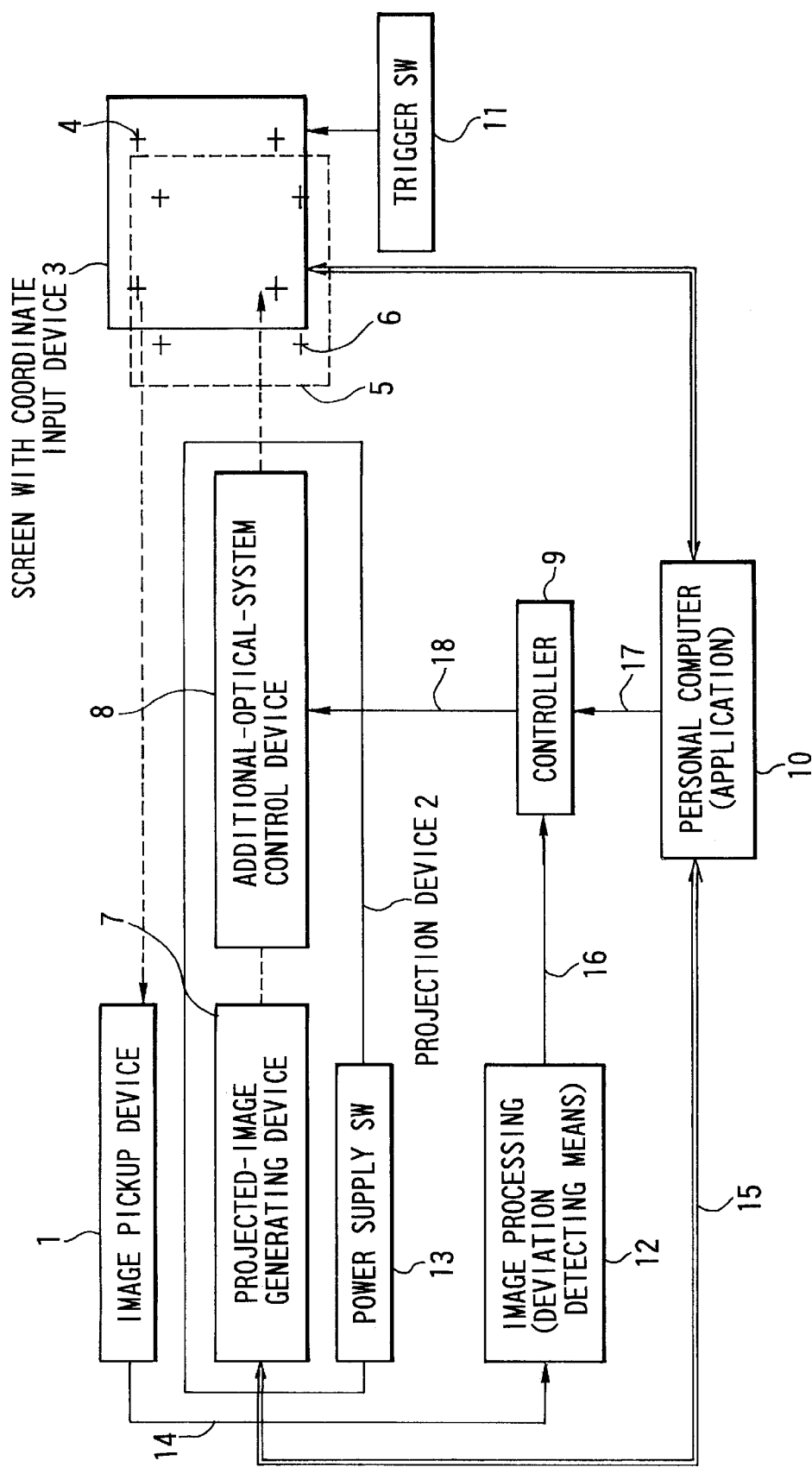
FIG. 2 is a block diagram showing the arrangement of the first embodiment.
Figure 3:
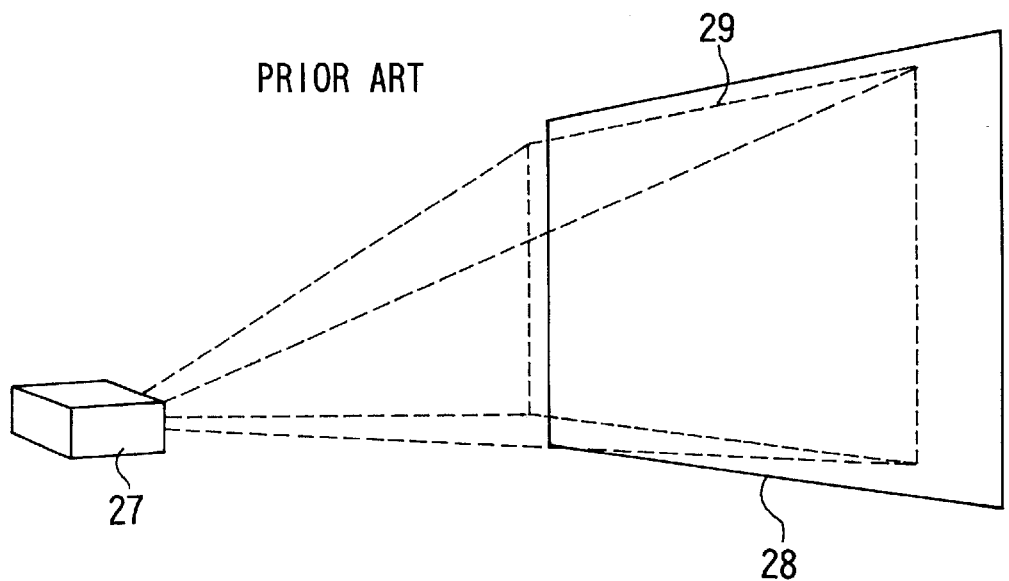
FIG. 3 shows in outline the entire conventional projection-type image display apparatus.
Figure 4:
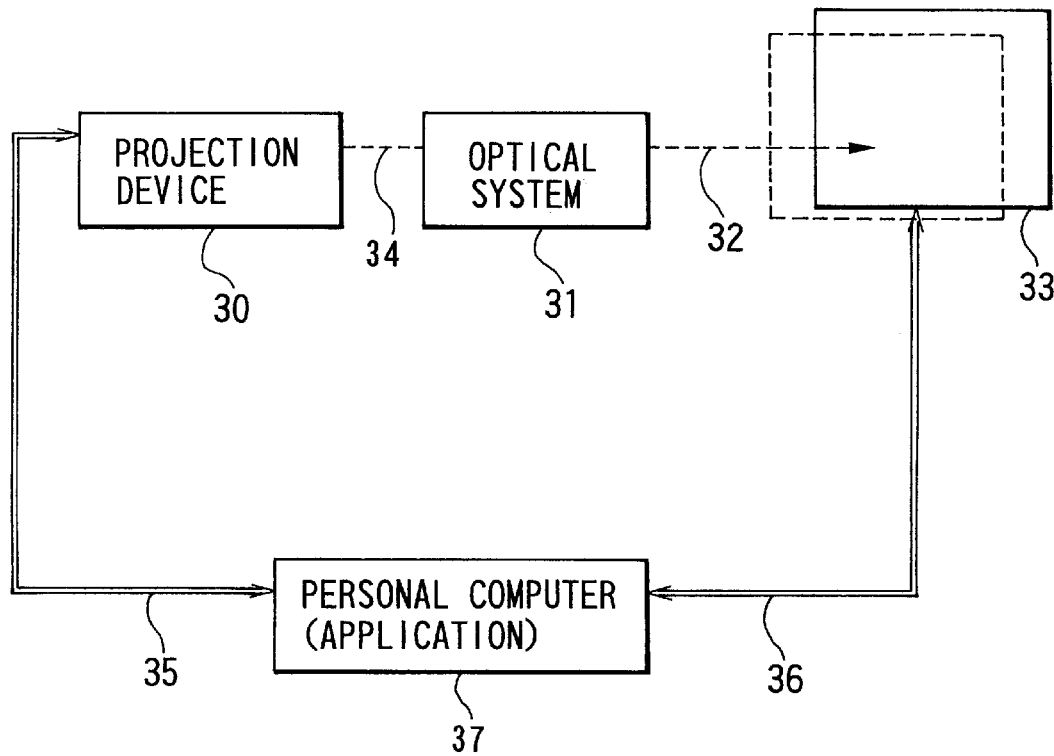
FIG. 4 is a block diagram showing the arrangement of the conventional projection-type image display apparatus shown in FIG. 3.

FIGS. 1 and 2 relate to a projection-type image display apparatus according to a first embodiment of the invention.

Referring to FIG. 1 which shows the arrangement of the first embodiment in outline, the projection-type image display apparatus is composed mainly of a projection device 2, an image pickup device 1 and a screen 3. The screen 3 is provided with a marker group 4 which is arranged to be displayed as four marks "+". These marks are displayed at four corner positions of a rectangular frame of the screen 3.

An optical image (projected image) 5 indicated by broken lines is projected from the projection device 2 onto the screen 3. The projected image 5 is projected to be either within the screen 3 in its entirety or outside of the screen 3 in part on the same plane as the screen 3. Further, the projected image 5 is provided with a marker group 6 which indicates the position, the size and the angle of torsion of the projected image 5.

In the first embodiment, the image pickup device 1 first picks up the image of the screen 3, that of the marker group 4 on the screen 3, that of the projected image 5 and that of a marker 6 on the projected image 5. After that, an additional optical system which is included in the projection device 2 as will be described later herein acts to optically correct deviations in position and size and the angle of torsion of the projected image 5 to adjust the projected image 5 gradually to the screen 3. These actions are simultaneously carried on in a feedback loop and are automatically carried out successively.

Figure 8:
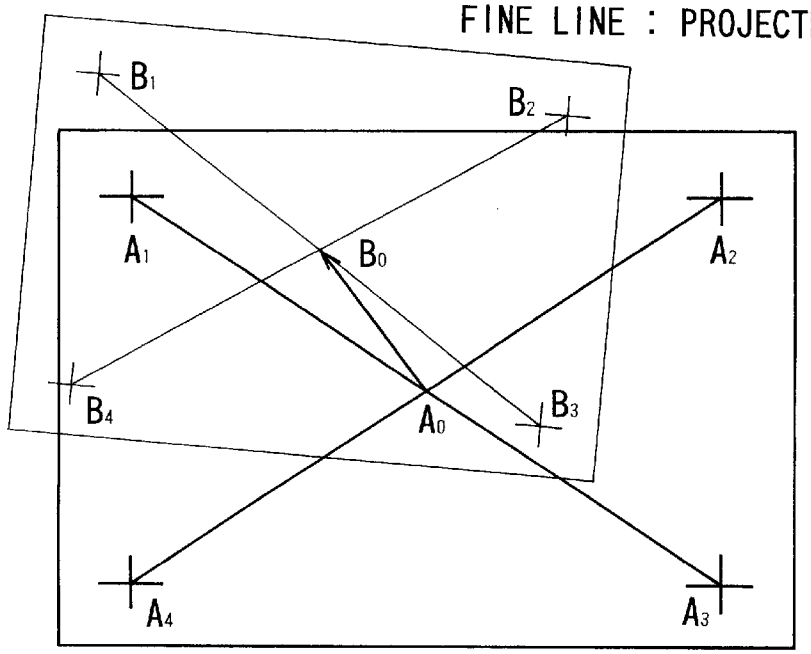
FIG. 8 is a diagram for explaining "deviation" parameters.

An image which is, for example, as shown in FIG. 8 is picked up by the image pickup device 1 prior to the execution of the above-stated adjusting action. Referring to FIG. 8, it is a main function of the first embodiment to converge and adjust points B1 to B4 which are four points of the marker group 6 of the projected image 5 to points A1 to A4 which are four points of the marker group 4 provided on the screen 3.

FIG. 2 is a block diagram showing blocks related to the above-stated automatic adjusting function of the first embodiment.

As shown in FIG. 2, the projection device 2 includes a projected-image generating device 7 and an additional-optical-system control device 8 which is arranged to control the additional optical system.

An image signal is sent from a personal computer 10 to the projected-image generating device 7 through a graphic controller or the like which is not shown.

The personal computer 10 is arranged to act as a control means for controlling the entire projection-type image display apparatus and to communicate, through a communication cable of RS232C or the like, with the screen 3. The screen 3 is provided with a coordinate input device.

An optical image generated by the projected-image generating device 7 is projected onto the screen 3 as a projected image 5, through the additional-optical-system control device 8, either without protruding outside of the screen 3 or in a state of protruding outside in part on the same plane as the screen 3.

The image pickup device 1 is arranged to pick up the image of the projected image 5, that of the marker group 6, that of the screen 3 having the coordinate input device and that of the marker group 4. The images picked up are then converted into an electrical signal 14. The electrical signal 14 is sent from the image pickup device 1 to a deviation detecting means 12 which is arranged to detect deviations by carrying out an image processing action on the electrical signal 14.

The deviation detecting means 12 has a function of extracting, from the image information on the marker groups 4 and 6 picked up by the image pickup device 1, three elements of deviation or discrepancy between the projected image 5 and the screen 3, i.e., a positional deviation, a deviation in size, and an angle of torsion (see FIGS. 8 to 11). The three elements of deviation are extracted as parameters 16, which are sent to a controller 9.

The controller 9 is arranged to form an additional-optical-system control instruction 18 on the basis of the parameter information on the three deviation elements sent from the deviation detecting means 12. The additional-optical-system control instruction 18 is sent from the controller 9 to the additional-optical-system control device 8.

The additional optical system which is under the control of the additional-optical-system control device 8 is composed mainly of three optical members. These three optical members correspond respectively to the three deviation elements. The three deviation elements are optically corrected by moving or deforming these three optical members in accordance with the above-stated additional-optical-system control instruction 18.

A control signal 17 is sent from the personal computer 10 to the controller 9. The above-stated additional-optical-system control instruction 18 is successively updated by the controller 9 only when the control signal 17 from the personal computer 10 is in an on-state.

While the control signal 17 is in an off-state, the additional-optical-system control instruction 18 is held in abeyance. In other words, the adjusting work of the first embodiment is carried on while the control signal 17 is in its on-state. When the control signal 17 turns into its off-state, an adjusted state which is obtained immediately before the off-state is kept unvarying.

The first embodiment is arranged to have two modes for the above-stated control signal 17. Either of the two modes can be selected and set by operating the personal computer 10. The two modes are as follows.

Mode 1: The adjusting work is carried on in real time as long as a power supply switch 13 which is provided at the projection device 2 is in its on-state. In other words, the state of feedback loop continues to be updated.

Mode 2: The adjusting work is performed for a predetermined period of time only when a trigger switch 11 provided at the screen 3 which has the coordinate input device is turned on. After the predetermined period of time, the adjusted state thus obtained is retained.

The three deviation elements, i.e., "position", "size" and "angle of torsion" are next described below.

Figure 9:
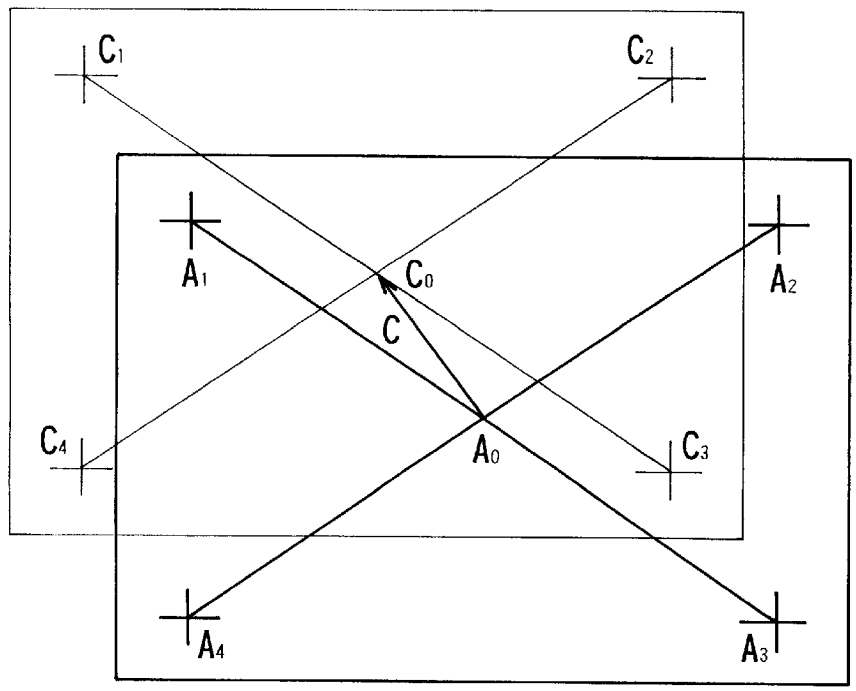
FIG. 9 is a diagram for explaining the "deviation" parameters.
Figure 10:
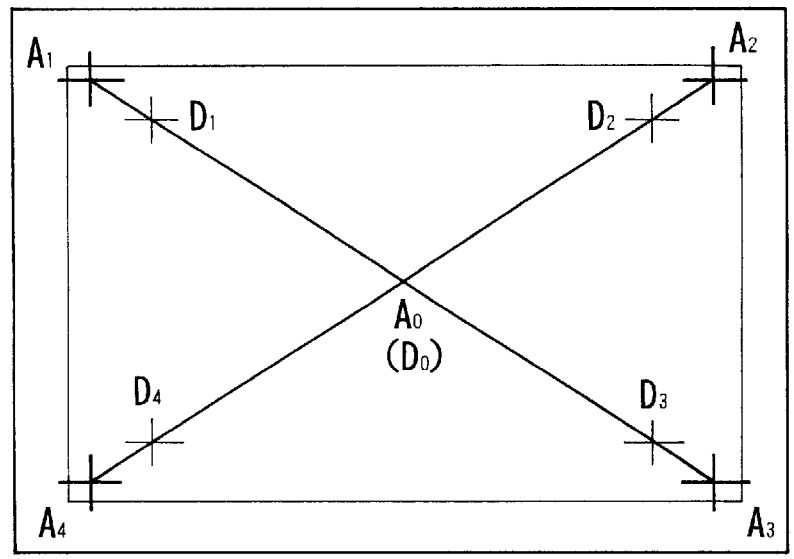
FIG. 10 is a diagram for explaining the "deviation" parameters.
Figure 11:
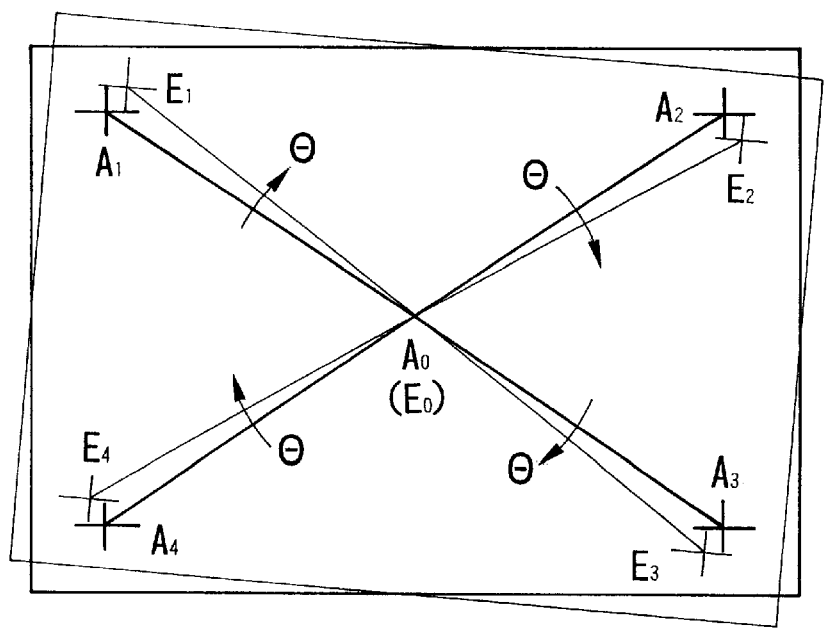
FIG. 11 is a diagram for explaining the "deviation" parameters.

Before the adjusting function of the first embodiment is performed, the image picked up by the image pickup device 1 is generally something like what is shown in FIG. 8. The image shown in FIG. 8 contains the three deviation elements, i.e., position, size and angle of torsion. FIGS. 9, 10 and 11 respectively show a deviation in position, a deviation in size and an angle of torsion, which are extracted from the image shown in FIG. 8.

Referring to FIGS. 9, 10 and 11, parameters indicative of the three elements of deviation (position, size and angle of torsion) are defined as described below. Further, procedures for obtaining the parameters from the coordinates A1 to A4 of the marker group 4 which represents the position of the screen 3 and the coordinates B1 to B4 of the marker group 6 which represents the projected image are also described.
[Definition of the Parameters]

Vector of positional deviation: C (see FIG. 9)

Ratio of size: $\Delta$ = (segment D1, D3) / (segment A1, A3) (see FIG. 10)

Rotation angle of torsion: $\theta$ (see FIG. 11) [Computation of C, $\Delta$ and $\theta$]

As shown in FIGS. 8, 9, 10 and 11, the barycenter position of the coordinates A1 to A4 is defined as A0, and the barycenter positions of other coordinates are defined respectively as B0, C0, D0 and E0.

The coordinates A1 to A4 and B1 to B4 of the marker groups 4 and 6 are first obtained by the image pickup device 1. The barycenters A0 and B0 are obtained from these coordinates. Since it is apparent that the positions of the barycenters B0 and C0 are equal, the positional deviation vector C is expressed as follows:

C = vector ($\rightarrow$) A0, C0 = vector ($\rightarrow$) A0, B0

The positional deviation vector C thus can be obtained from the coordinates A1 to A4 and the coordinates B1 to B4.

It is apparent that a rectangle defined by the coordinates D1 to D4 is of the same size as a rectangle defined by the coordinates B1 to B4. Hence, (segments D1, D3) =(segment B1, B3). Therefore, the ratio of size $\Delta$ thus can be expressed as follows:

$\Delta$= (segment D1, D3) / (segment A1, A3)

= (segment B1, B3) / (segment A1, A3)

The ratio of size $\Delta$ thus can be obtained from the coordinates A1 to A4 and the coordinates B1 to B4.

In actuality, however, the ratio of size $\Delta$ is obtained by taking some distortion of the rectangle into consideration as expressed below:

A =SQRT {(segment B2, B4) / (segment A2, A4)} * {(segment B1, B3) / (segment A1, A3)}

Figure 12:
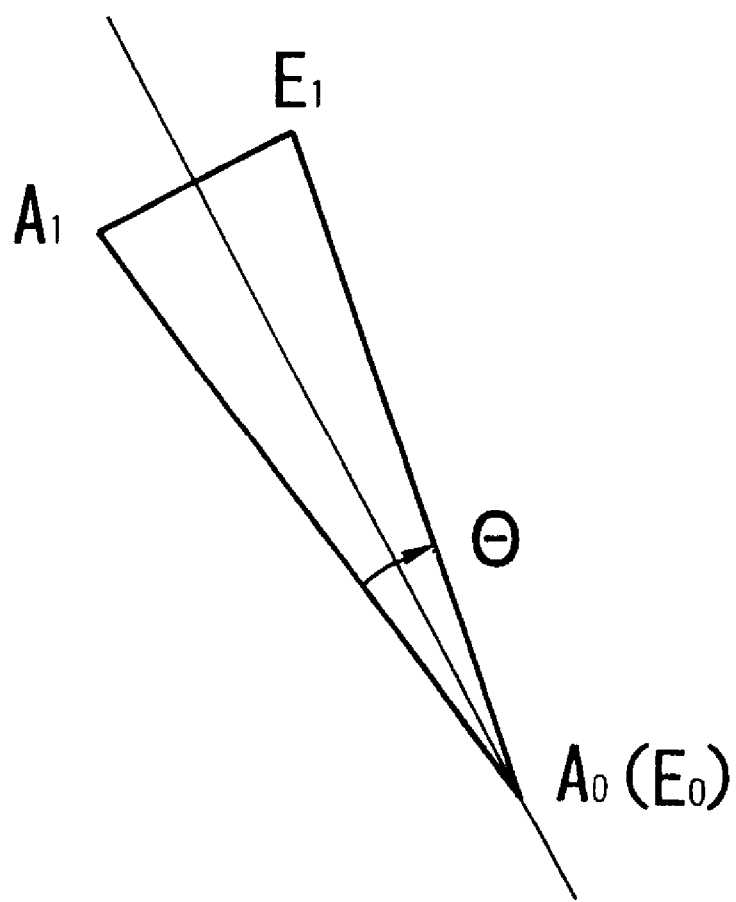
FIG. 12 is a diagram for explaining the "deviation" parameters.
Figure 13:
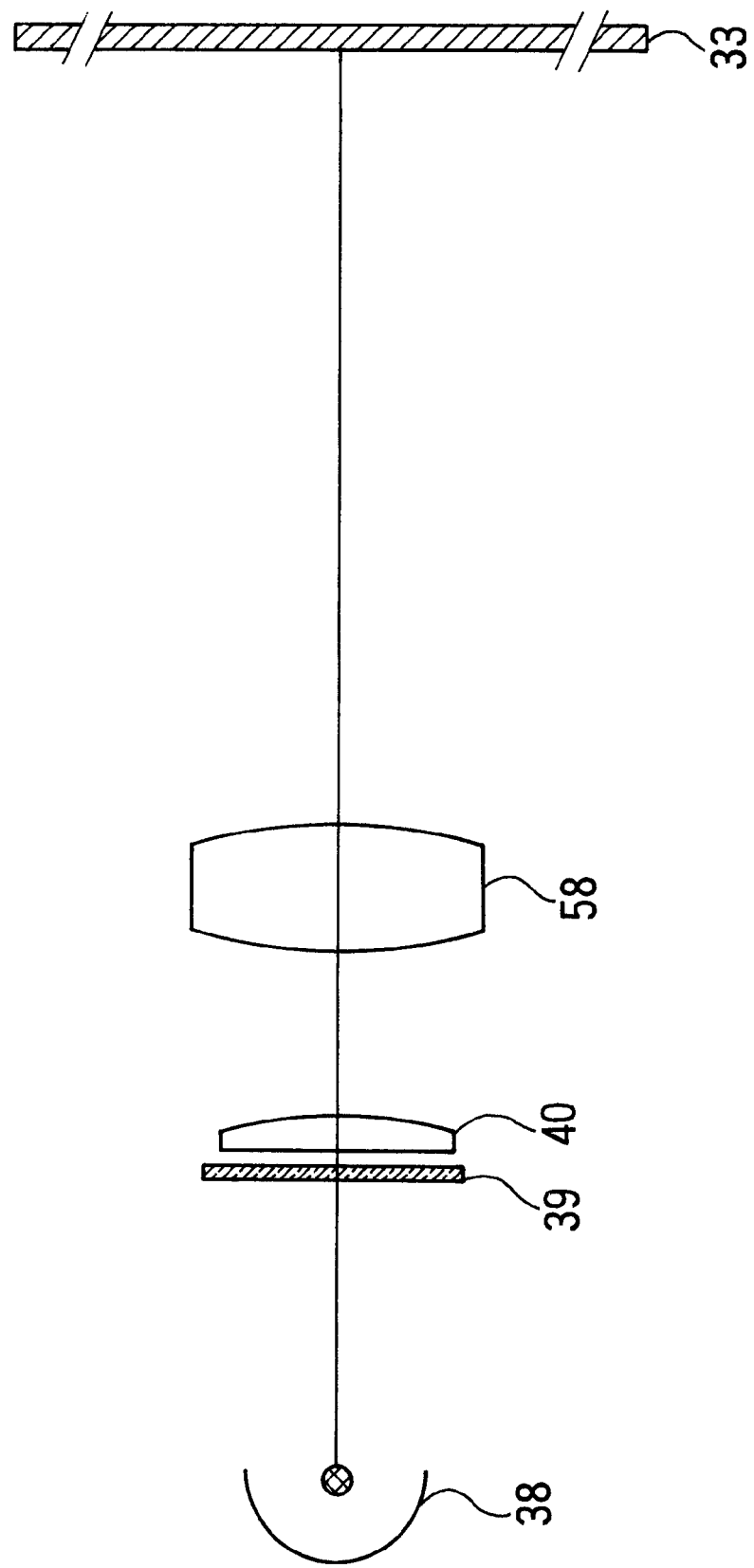
FIG. 13 shows the arrangement of an optical system of the conventional projection-type image display apparatus.

Next, the coordinates E1 to E4 shown in FIG. 11 can be obtained by using the positional deviation vector C and the ratio of size $\Delta$ which are obtained for the coordinates B1 to B4 in the above-stated manner. Further, referring to FIG. 12 which shows a part of FIG. 11 in detail, the rotation angle of torsion $\theta$ can be expressed as follows:

$\theta$=2 * ARCSIN {(segment A1, E1) / 2} * (segment A0, A1).

Thus, the rotation angle of torsion $\theta$ can be obtained from the coordinates A1 to A4 and the coordinates B1 to B4.

The rotation angle of torsion $\theta$ is actually obtained with some distortion taken into consideration in the following manner:

$\theta$= {ARCSIN [(segment A1, E1) / 2] * (segment A0, A1)+ARCSIN [(segment A2, E2) / 2] * (segment A0, A2) +ARCSIN [(segment A3, E3) / 2] * (segment A0, A3) +ARCSIN [(segment A4, E4) / 20] * (segment A0, A4)} / 2

The parameters C, $\Delta$ and $\theta$ thus can be obtained from the coordinates A1 to A4 and B1 to B4 of the marker groups 4 and 6 through the procedures described above.

Figure 6:
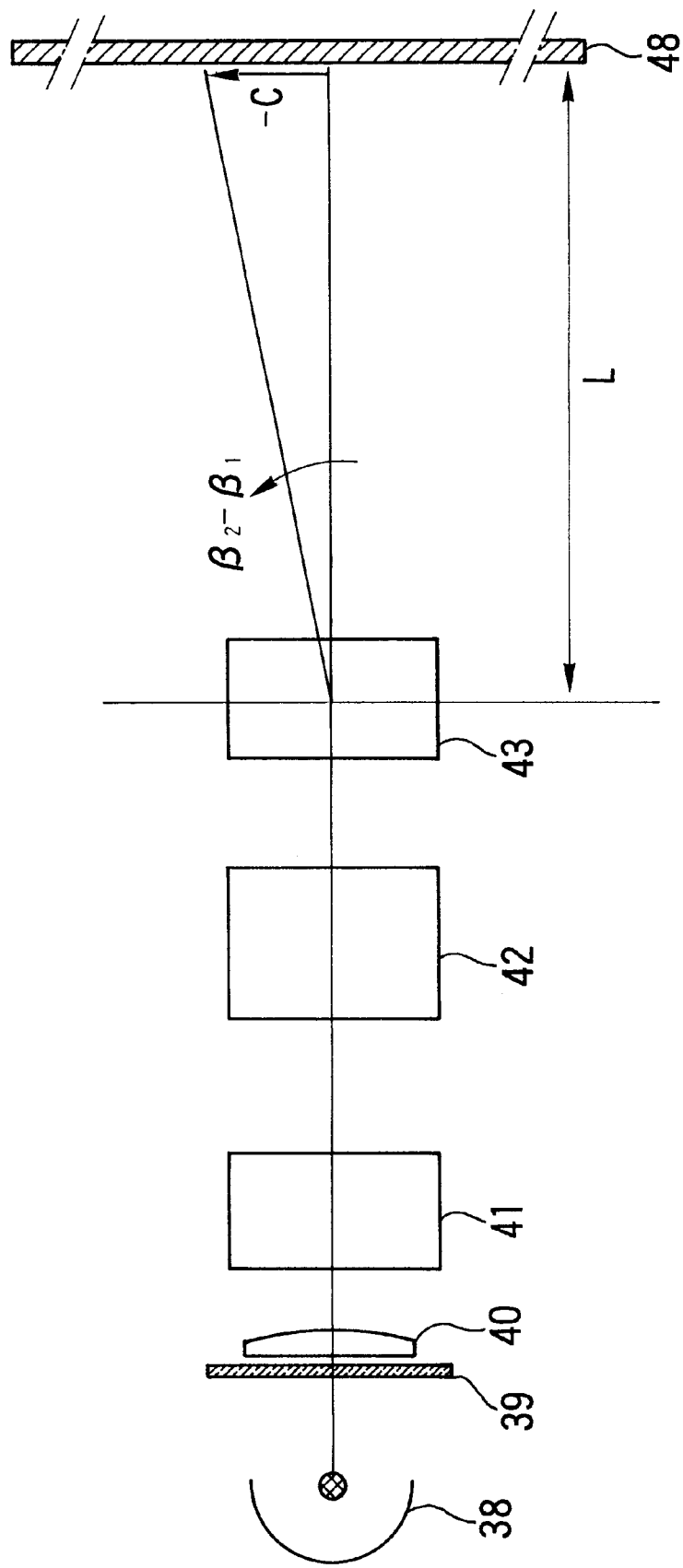
FIG. 6 shows the arrangement of an additional optical system in the first or second embodiment.

The arrangement of the projection device 2 composed of the projected-image generating device 7 and the additional-optical-system control device 8 is next described in detail. FIG. 6 shows in outline the optical arrangement of the projection device 2 in the first embodiment.

Referring to FIG. 6, the optical arrangement of the projection device 2 includes an optical member 41 for correcting torsion, an optical member 42 for correcting a deviation of size, and an optical system 43 for correcting a positional deviation.

Parallel rays of light emitted from a light source 38 form an optical image by passing through a liquid crystal light valve 39. Then, the optical image passes through a condenser lens 40. After that, the optical image has its torsion corrected by the optical member 41, its deviation of size corrected by the optical member 42 and its positional deviation corrected by the optical member 43, and is then projected onto a screen 48.

Figure 7A:
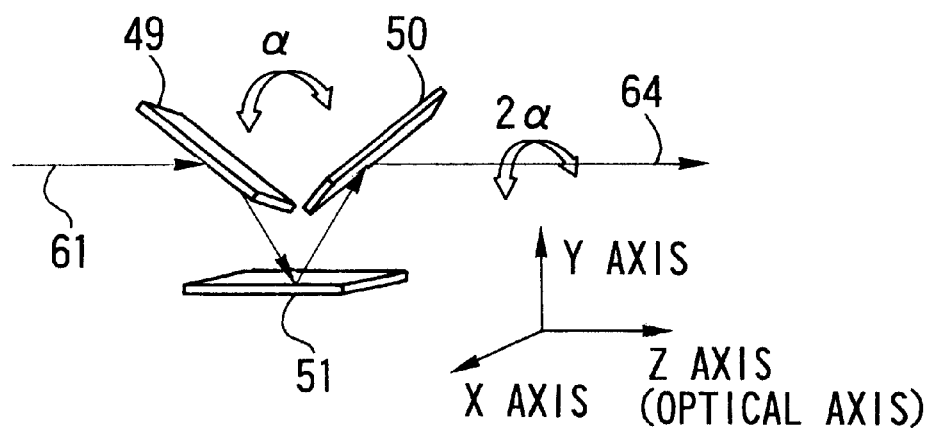
FIGS. 7(a) and 7(b) respectively show optical members.
Figure 14:
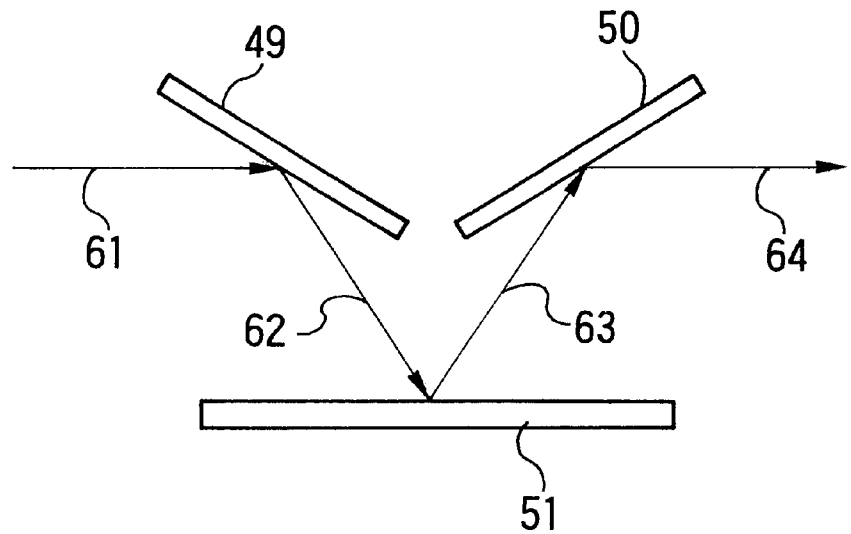
FIG. 14 shows a correction optical system in the first embodiment.
Figure 15:
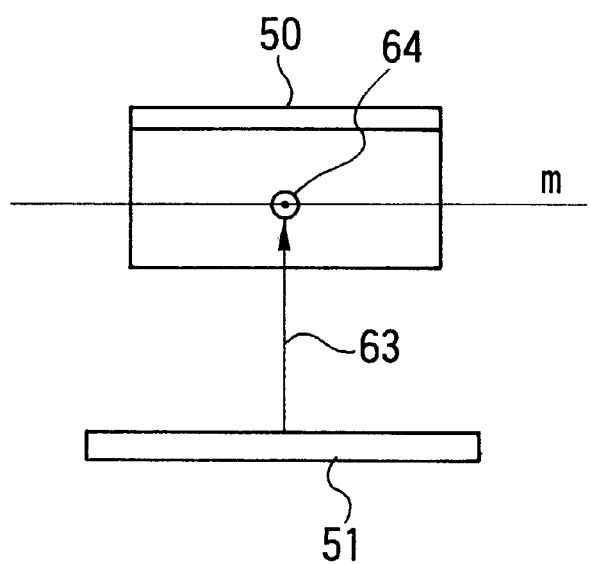
FIG. 15 shows the correction optical system in the first embodiment.

The optical member 41, which is provided for correcting torsion, is an image rotator which is composed fundamentally of three total-reflection mirrors 49, 50 and 51, as shown in FIG. 7(a). Further, the details of the optical member 41 are shown in FIGS. 14 and 15. FIG. 14 shows the optical member 41 as viewed in the direction of an X axis in FIG. 7(a). FIG. 15 shows the optical member 41 as viewed in the direction of a Z axis.

As shown in FIG. 14, incident light is reflected in the sequence of rays of light 61, 62, 63 and 64. In other words, an image represented by the rays of light 61 is converted into an image represented by the rays of light 64. In this instance, the image represented by the rays of light 64 is inverse to the image represented by the rays of light 61 (and becomes an image which is axially symmetric with respect to a straight line m in FIG. 15). It is, therefore, necessary to electrically invert beforehand the image to be represented by the rays of light 61.

Accordingly, when the optical member 41 composed of the mirrors 49, 50 and 51 is rotated as much as a degree $\alpha$ along its optical axis, the straight line m also rotates as much as the degree $\alpha$ along the optical axis. This causes the image represented by the rays of light 64 to rotate as much as a degree $2\alpha$ along the optical axis. Further, since the image has been compensated for inversion beforehand, the image thus obtained has been rotated as much as a degree $-2\alpha$ with respect to a true image. The angle of torsion is thus corrected, if the rotating degree $\alpha$ obtained when the above-stated feedback loop converges is in the following relation to the parameter $\theta$ of the initial rotation angle of torsion:

$\alpha=\theta/2$

The optical member 42, which is provided for correcting a deviation in size, is a so-called automatic zoom optical member. In a case where the parameter of the deviation in size at the initial stage is Δ, the deviation in size is corrected if the zooming ratio of the optical member 42 obtained when the above-stated feedback loop converges is 1/Δ times as much as the value obtained before the correction.

Figure 7B:
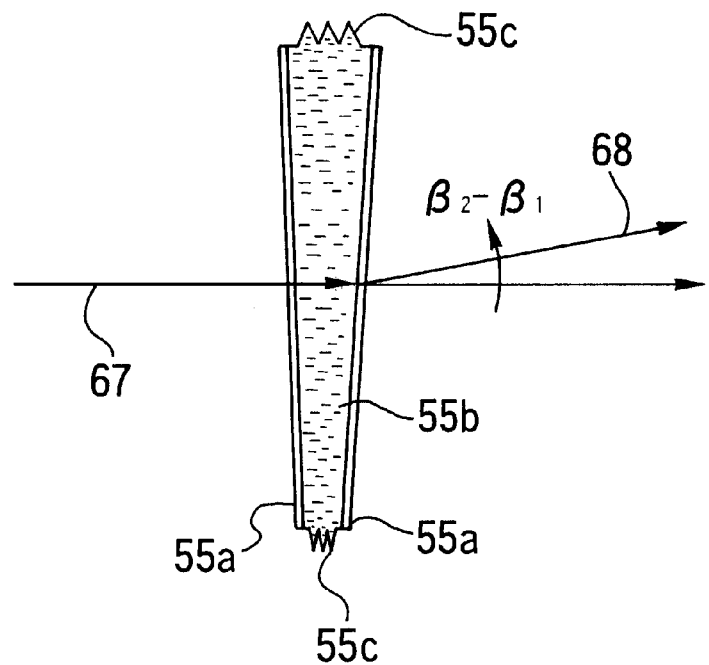

The optical member 43, which is provided for correcting a positional deviation, is a so-called variable angle prism. As shown in FIG. 7(b), the optical member 43 is formed by having an optically transparent substance 55b placed in between two transparent optical members 55a and sealing the transparent substance 55b within a space formed with bellows members 55c. The optical member 43 is thus arranged to act as a prism with a prism apex angle formed as desired by causing at least one of the two optical members 55a to be rotated by applying from outside an electrically controlled urging force. In the case of the first embodiment, a positional deviation is corrected by correcting the direction of rays of light with the optical member 43.

Assuming that the above-stated prism apex angle is β1, the optical axis is bent as much as β2 − β1, as shown in FIG. 7(b). The relation between β1 and β2 will be described later.

Therefore, if, at a point of time when the above-stated feedback loop converges, a relation of $$\tan(\beta 2 - \beta 1) = |C| / L$$

is established with respect to the parameter vector C of the positional deviation at the initial stage and it is in the opposite direction, the initial positional deviation has been corrected. In the formula above, L represents a distance between the screen 48 and the optical member 43, as shown in FIG. 6.

Figure 16:
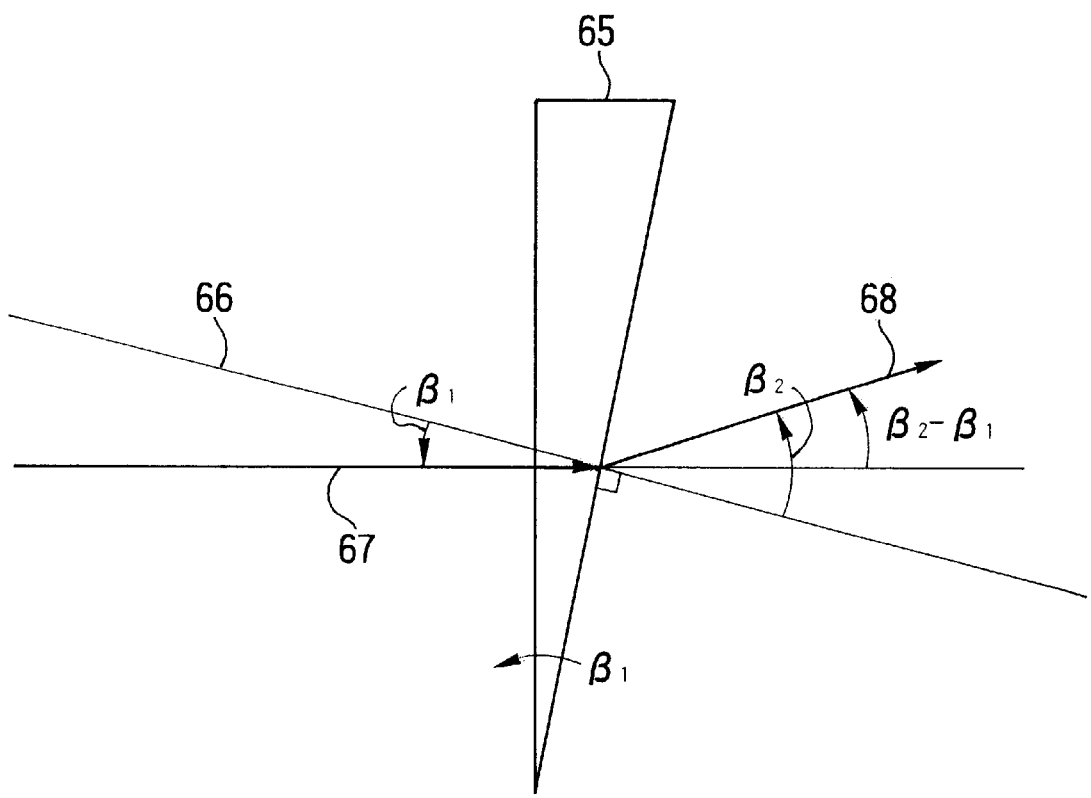
FIG. 16 shows a correction optical system in the first embodiment.

FIG. 16 shows the details of the optical member 43. In FIG. 16, reference numeral 65 denotes the prism which has the apex angle β1 and a refractive index n. A straight line 66 extends perpendicular to a surface from which the light from the prism 65 is discharged to the outside. Rays of light 67 and 68 form angles β1 and β2, respectively, with respect to the straight line 66. A relation between the angles β1 and β2 becomes, according to the Snell's law, as expressed below:

$$n = \mathrm{SIN}(\beta 2) / \mathrm{SIN}(\beta 1),$$ wherein n represents the refractive index of the internal substance for air.

It is also apparent from FIG. 16 that the light exiting from the prism 65 has been bent as much as the degree β2 − β1 with respect to the original optical axis.

As described above, the three optical members 41, 42 and 43 respectively have the functions of optically correcting the parameters θ, Δ and C which respectively indicate the three deviation elements. Accordingly, by appositely controlling these functions, the projected image can be adequately adjusted to the frame of the screen.

Figure 5:
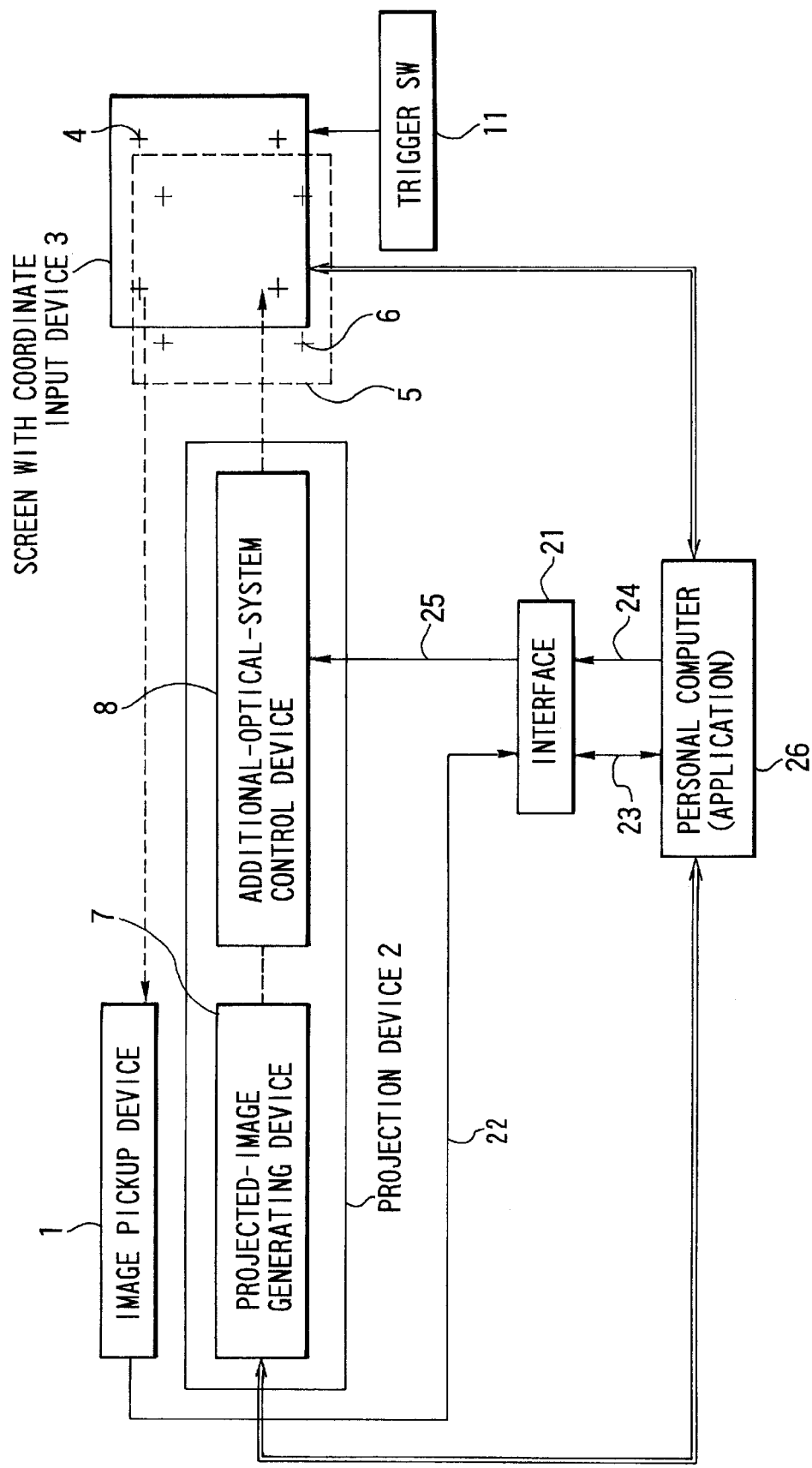
FIG. 5 is a block diagram showing the arrangement of a second embodiment of the invention.

FIG. 5 shows the arrangement of a projection-type image display apparatus according to a second embodiment of the invention. Referring to FIG. 5, information 22 obtained by the image pickup device 1, i.e., information on the positions of marker groups 4 and 6 (A1 to A4 and B1 to B4) is sent to a personal computer 26 through an interface 21. In the case of the second embodiment, the processes of detecting the above-stated deviations and generating an additional-optical-system control signal 24 are carried out by software at the personal computer 26.

The timing of sending the additional-optical-system control signal 24 from the personal computer 26 to the interface 21 is determined by an application working at the personal computer 26. In the second embodiment, there are provided the following patterns of operation.

(i) The deviation correcting adjustment action is performed at every predetermined period of time.

(ii) The deviation correcting adjustment action is performed when one window is changed over to another.

In other words, in using the apparatus according to the second embodiment, the user corrects deviations at convenient times. For example, in the case of a multi-window system, the deviation correcting adjustment action is made at the timing when window selection by the user is changed from one window over to another.

(iii) The deviation correcting adjustment action is performed every time the user pushes a trigger switch 11 which is provided at the screen 3 having a coordinate input device.

What is claimed is:

1. A projection type image display apparatus, comprising:
  an image projection device which projects an image on a projection plane;
  an image pickup device which picks up images of the plane and the image projected on the plane; and
  control means for detecting a deviation of the image projected on the plane relative to a predetermined area of the plane by using an output of said image pickup device and correcting the deviation.

2. A projection type image display apparatus, comprising:
  an image projection device which projects an image on a projection plane, said projection device having an optical system able to change a geometrical state of the projected image;
  an image pickup device which picks up images of the plane and the image projected on the plane; and
  control means for detecting a deviation of the image projected on the plane relative to a predetermined area of the plane by an output of said image pickup device and for controlling the optical system of said projection device so as to correct the deviation.

3. A projection type image display apparatus, comprising:
  an image projection device which projects an image on a projection plane;
  an image pickup device which picks up images of the plane and the image projected on the plane; and
  control means for detecting a deviation of the image projected on the plane relative to a predetermined area of the plane by using an output of the image pickup device and for controlling said projection device so as to correct the deviation.

4. A projection-type image display apparatus according to one of claims 1, 2 and 3, wherein said control means is arranged to correct a positional deviation of the projected image from the projection plane.

5. A projection-type image display apparatus according to one of claims 1, 2 and 3, wherein said control means is arranged to correct a deviation in size of the projected image from the projection plane.

6. A projection-type image display apparatus according to one of claims 1, 2 and 3, wherein said control means is arranged to correct torsion of the projected image with respect to the projection plane.

7. A projection-type image display apparatus according to one of claims 1, 2 and 3, further comprising a screen forming the projection plane, wherein said screen is provided with a first marker group for defining a display area of the projection plane or for defining a coordinate input area of the projection plane.

8. A projection-type image display apparatus according to claim 7, wherein said image projection device is arranged to generate, as a part of the projected image, a second marker group for defining an image area of the projected image.

9. A projection-type image display apparatus according to claim 8, wherein said image projection device is arranged to generate the second marker group in a position corresponding to the first marker group on the projection plane.

10. A projection-type image display apparatus according to claim 9, wherein said control means is arranged to detect a deviation of the projected image from the projection plane on the basis of coordinates of the first marker group and the second marker group.

11. A projection-type image display apparatus according to claim 10, wherein said control means is arranged to extract three independent parameters indicative of a positional deviation, a deviation in size, and torsion.

12. A projection-type image display apparatus according to claim 11, wherein said control means is arranged to extract the parameter indicative of a positional deviation, as a two-dimensional vector whose origin is a barycenter of the first marker group and whose terminal is a barycenter of the second marker group.

13. A projection-type image display apparatus according to claim 11, wherein said control means is arranged to extract the parameter indicative of a deviation in size, as a ratio of the length of a line segment determined by two specific points of the first marker group to the length of a line segment determined by two specific points of the second marker group corresponding to the two specific points of the first marker group.

14. A projection-type image display apparatus according to claim 11, wherein said control means is arranged to extract the parameter indicative of torsion, as an angle formed by a two-dimensional vector determined by two specific points of the first marker group and a two-dimensional vector determined by two specific points of the second marker group corresponding to the specific points of the first marker group.

15. A projection-type image display apparatus according to claim 4, wherein said control means for correcting a positional deviation is a variable angle prism arranged by sealing an optically transparent substance within a space formed between two transparent optical members to form an arbitrary apex angle by causing at least one of the two optical members to turn with an urging force which is electrically controlled from outside.

16. A projection-type image display apparatus according to claim 6, wherein said control means for correcting torsion is an image rotator having a plurality of mirrors and arranged to cause a passing image to rotate along an optical axis by rotating the plurality of mirrors along the optical axis.

17. A projection-type image display apparatus according to claim 5, wherein said control means for correcting a deviation in size is a zoom optical system which is electrically controllable.

18. A projection type image display apparatus, comprising:

a screen on which a marker is formed;

an image projection device which projects an image on said screen;

an image pickup device which picks up images of said screen and the image projected on said screen; and control means for detecting a deviation of the projected image relative to a predetermined area of said screen by determining a positional relation between a marker of said screen and a marker of the projected image by using an output of said image pickup device, and for controlling said projection device so as to correct the deviation.

19. A projection type image display apparatus, comprising:

a screen having a function to input coordinates;

an image projection device which projects an image on said screen;

an image pickup device which picks up images of said screen and the image projected on said screen; and control means for detecting a deviation of the projected image relative to a predetermined area of said screen in response to the input of the coordinates and for controlling said projection device so as to correct the deviation.

20. A projection-type image display apparatus according to one of claims 1, 2 3, 18 and 19, wherein said control means is arranged to optically correct a positional deviation, a deviation in size, and torsion independently of each other.

21. A projection-type image display apparatus according to one of claims 10 and 19, wherein said control means is arranged to correct a positional deviation of the projected image from said screen.

22. A projection-type image display apparatus according to one of claims 18 and 19, wherein said control means is arranged to correct a deviation in size of the projected image from said screen.

23. A projection-type image display apparatus according to one of claims 18 and 19, wherein said control means is arranged to correct torsion of the projected image with respect to said screen.

24. A projection-type image display apparatus according to claim 21, wherein said control means for correcting a positional deviation is a variable angle prism arranged by sealing an optically transparent substance within a space formed between two transparent optical members to form an arbitrary apex angle by causing at least one of the two optical members to turn with an urging force which is electrically controlled from outside.

25. A projection-type image display apparatus according to claim 23, wherein said control means for correcting torsion is an image rotator having a plurality of mirrors and arranged to cause a passing image to rotate along an optical axis by rotating said plurality of mirrors along the optical axis.

26. A projection-type image display apparatus according to claim 22, wherein said control means for correcting a deviation in size is a zoom optical system which is electrically controllable.

* * * * *

UNITED STATES PATENT AND TRADEMARK OFFICE
CERTIFICATE OF CORRECTION

PATENT NO. : 6,056,408

DATED : May 2, 2000

INVENTOR(S): KIWAMU KOBAYASHI

It is certified that error appears in the above-identified patent and that said Letters Patent is hereby corrected as shown below:

ON THE TITLE PAGE

Item

[54] TITLE:

"METHOD AND" should read --METHOD FOR--.

Item

[56] REFERENCES CITED:

U.S. PATENT DOCUMENTS, "Hamil" should read --Hamill--.

COLUMN 1:

Line 1, "METHOD AND" should read --METHOD FOR--.

COLUMN 7:

Line 28, "[Computation" should read --¶ [Computation--.
Line 47, "(segments" should read --¶ (segments--.
Line 48, "Therefore," should read --¶ Therefore,--.

UNITED STATES PATENT AND TRADEMARK OFFICE
CERTIFICATE OF CORRECTION

PATENT NO. : 6,056,408

DATED : May 2, 2000

INVENTOR(S): KIWAMU KOBAYASHI

It is certified that error appears in the above-identified patent and that said Letters Patent is hereby corrected as shown below:

COLUMN 12:

Line 26, "claims 10" should read --claims 18--.

Signed and Sealed this

Twenty-ninth Day of May, 2001

Attest:

NICHOLAS P. GODICI

*Attesting Officer*   *Acting Director of the United States Patent and Trademark Office*